US005966453A

United States Patent [19]

Koyano et al.

[11] Patent Number: 5,966,453

[45] Date of Patent: Oct. 12, 1999

[54] SPEAKER SYSTEM FOR USE IN AN AUTOMOBILE VEHICLE

[75] Inventors: Shinji Koyano; Teruo Baba; Ziqing Zhang; Junko Yamamoto, all of Saitama-ken, Japan

[73] Assignee: Pioneer Electronic Corporation, Tokyo, Japan

[21] Appl. No.: 09/015,548

[22] Filed: Jan. 29, 1998

[30] Foreign Application Priority Data

Feb. 6, 1997 [JP] Japan .................................... 9-024080

[51] Int. Cl.$^{6}$ ........................................................ H04B 1/00

[52] U.S. Cl. ............................................... 381/86; 381/389

[58] Field of Search .............................. 381/86, 302, 389, 381/386, 332, 87

[56] References Cited

U.S. PATENT DOCUMENTS

| | | | |
|---|---|---|---|
| 4,281,224 | 7/1981 | Castagna | 381/86 |
| 4,905,860 | 3/1990 | Kurihara et al. | 381/86 |

*Primary Examiner*—Vivian Chang

*Attorney, Agent, or Firm*—Nikaido, Marmalstein Murray & Oram LLP

[57] ABSTRACT

A speaker system for use in an automobile vehicle, comprises: a pair of high frequency speakers disposed at opposite ends in a lateral direction of a front section within the vehicle; a pair of low/middle frequency speakers disposed at opposite ends in a lateral direction of the front section, a whole frequency speaker located in the center of the front section. Each of the high frequency speakers is a horn speaker made from a part of a windshield, a part of a side glass and a part of an upper surface of a dashboard in the vehicle.

11 Claims, 6 Drawing Sheets

SPEAKER SYSTEM FOR USE IN AN AUTOMOBILE VEHICLE

BACKGROUND OF THE INVENTION

The present invention relates to a speaker system, in particular to a speaker system for use in an automobile vehicle.

It has been known that a speaker system for use in an automobile vehicle is usually a multi-speaker system, such as that shown in FIG. 6.

Referring to FIG. 6, a conventional multi-speaker system comprises a plurality of speakers 4 disposed in a front section, side doors 2 and a rear tray 3 within an automobile vehicle 1. With the use of such an arrangement, it is possible for an entire area within the vehicle to obtain a uniform sound pressure, enabling all the persons staying in the vehicle to easily and similarly enjoy music or the like.

However, there is a problem with the conventional multi-speaker system illustrated in FIG. 6. Namely, in use of the speaker system, there are primary sounds emitted directly from individual speakers 4 and secondary sounds generated when the primary sounds are reflected from inner wall of the automobile vehicle. Since the primary sounds and the secondary sounds will be unavoidably synthesized together, there is always a fluctuation in the frequency characteristic of the multi-speaker system (due to a reflection synthesizing effect), resulting in a complex peak/dip phenomenon in audible frequency bands.

To alleviate the problem caused by the reflection synthesizing effect, it is necessary to simplify the sound sources involved in a multi-speaker system. Namely, the number of speakers (serving as sound sources) should be made as fewer as possible and these speakers should be arranged in only one direction. Further, to ensure an audio effect similar to a music listening room, it is important to satisfy the following requirements.

(a) A sound image should be located in the front.

(b) A sound image deviation caused due to different seat positions within an automobile vehicle should be eliminated.

(c) A peak/dip phenomenon caused due to the reflection synthesizing effect should be eliminated.

In the above three requirements, requirement (a) is particularly important for obtaining a satisfactory effect of music enjoyment. That is, if a person wants to fully enjoy music, the music sound image should be located in the front, so that music sound could come from the front, making it easy for a person to naturally hear and fully enjoy the music. This fact may also be understood in view of the structure of a man's ears.

However, in the multi-speaker system shown in FIG. 6, since the speakers are disposed in every direction for the purpose of creating a uniform music space within an automobile vehicle, it is difficult to have the sound image located in the front within a vehicle. In detail, since there are speakers 4 disposed in the front section, on the side doors 2 and on the rear tray 3 within the vehicle 1, sound signals reflected from inner walls of the vehicle 1 will reach person's ears much later than the sound signals directly emitted from the speakers. As a result, it is impossible to have a sound image located in the front within the vehicle 1. Particularly, in the multi-speaker system shown in FIG. 6, a sound image will be unavoidably located behind a driver and a passenger sitting beside the driver. Consequently, the driver and the passenger will have uncomfortable sound feelings, making it difficult for them to fully enjoy music.

SUMMARY OF THE INVENTION

It is an object of the present invention to provide an improved automobile speaker system capable of locating a sound image in the front within a vehicle by increasing the level of sound signals directly emitted from speakers, so as to solve the above-mentioned problems peculiar to the above-mentioned prior art.

According to the present invention, there is provided a speaker system for use in an automobile vehicle, said speaker system comprising: a pair of high frequency speakers disposed at opposite ends in a lateral direction of a front section within the vehicle. In particular, each of the high frequency speakers is a horn speaker made from a part of a windshield, a part of a side glass and a part of an upper surface of a dashboard in the vehicle.

In one aspect of the present invention, the speaker system further includes a pair of low/middle frequency speakers disposed at opposite ends in a lateral direction of the front section within the vehicle. Each of the low/middle frequency speakers is positioned such that its diaphragm is directed to a front seat.

In another aspect of the present invention, each of the low/middle frequency speakers is a bass-reflex type speaker having a duct. The two bass-reflex type speakers are installed on a dashboard, in a manner such that both ducts are directed to a center console within the vehicle.

In a further aspect of the present invention, on each side of the front section in the vehicle, a high frequency speaker and a low/middle frequency speaker are located in positions close to each other.

In a still further aspect of the present invention, a high frequency speaker on the left is positioned to have its opening directed rightwardly, another high frequency speaker on the right is positioned to have its opening directed leftwardly, rendering two normal lines of the two speakers intersected with each other in a nearby space.

The speaker system of the present invention further includes a whole frequency speaker located in the center of the front section within the vehicle.

The above objects and features of the present invention will become more understood from the following description with reference to the accompanying drawings.

DETAILED DESCRIPTION OF THE PREFERRED EMBODIMENTS

Figure 1:
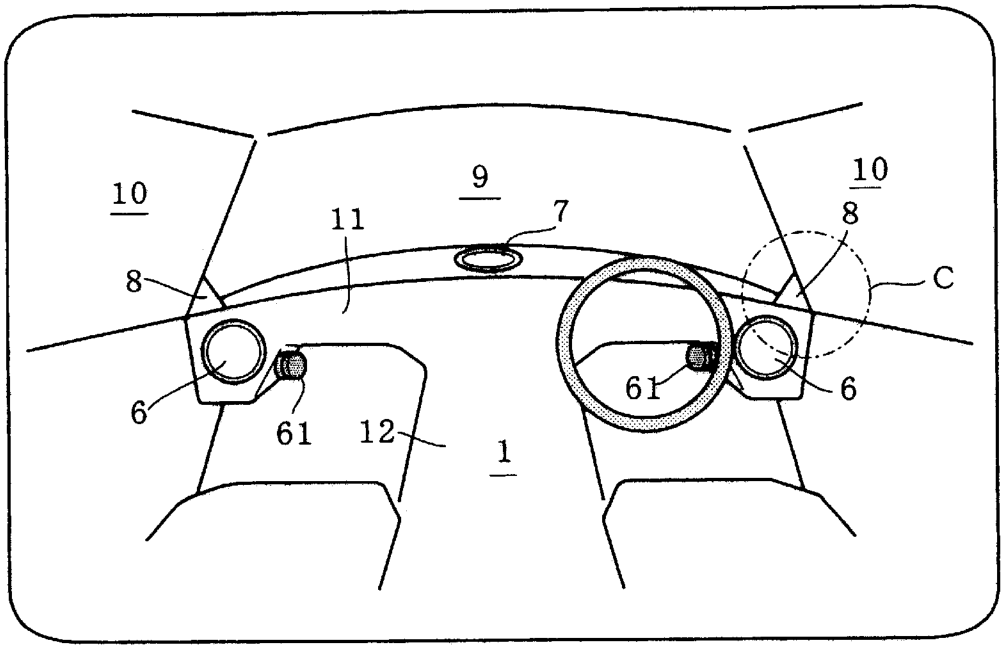
FIG. 1 is a perspective view showing an automobile speaker system according to the present invention.

Referring to FIG. 1, a speaker system according to the present invention, includes a pair of low/middle frequency speakers 6,6 disposed on left and right ends on a dashboard 11, a whole frequency speaker 7 disposed on an upper surface of the dashboard 11, a pair of high frequency speakers 8,8 disposed above the dashboard 11 close to the pair of low frequency speakers 6,6.

In particular, the low/middle frequency speakers 6,6 are positioned such that their diaphragms are directed to front seats in the vehicle. In detail, the low/middle frequency speakers 6,6 are bass-reflex type speakers, which can be made compact in size but can provide large amplitude and are capable of preventing sound pressure level from decreasing.

Further, as shown in FIG. 3, each low/middle frequency speaker 6 is formed with a duct 61 on one side thereof. A pair of speakers 6,6 are disposed in a manner such that both their ducts 61,61 are directed to a center console 12 which is provided between a driver's seat and an assistant's seat.

Figure 3A:
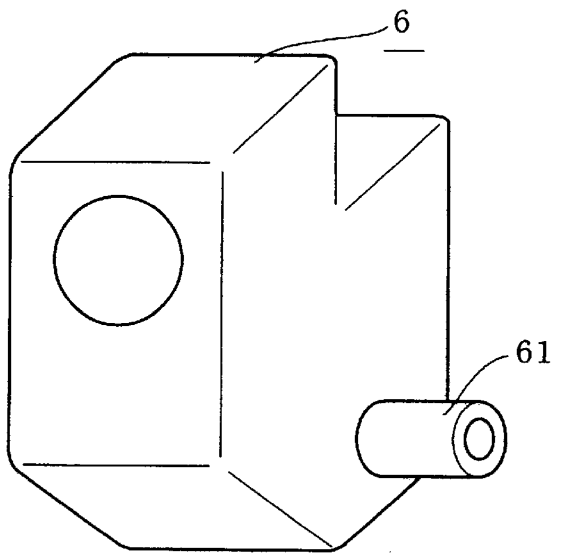
FIG. 3*a* is a perspective view showing a low/middle frequency speaker.

In detail, a speaker 6 shown in FIG. 3*a* may be installed on the left end of the dashboard 11 with its duct 61 facing right, another speaker 6 (not shown, but is symmetrical with that shown in FIG. 3*a*) may be installed on the right end of the dashboard 11 with its duct 61 facing left, as shown in FIG. 1.

Figure 3B:
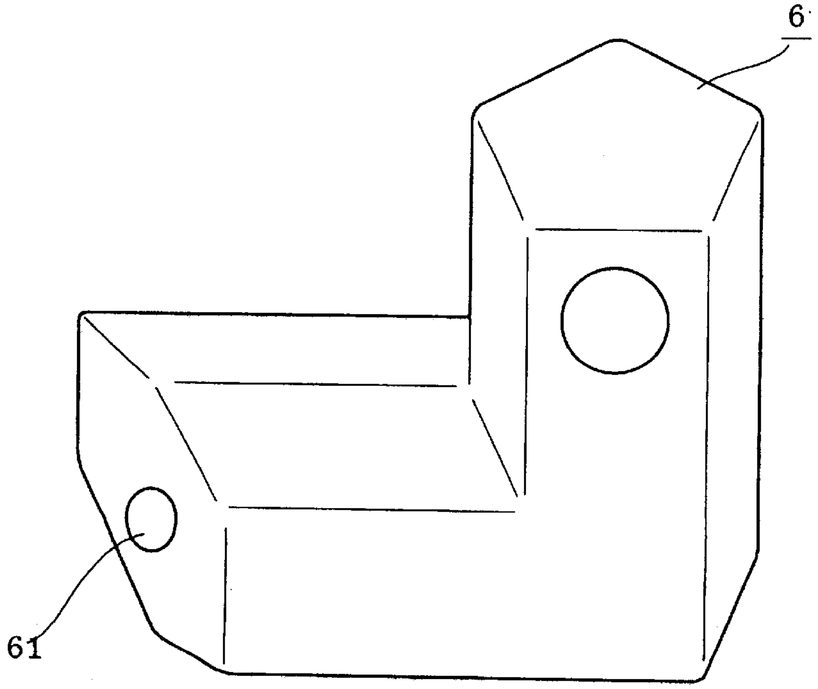
FIG. 3*b* is a perspective view showing another low/middle frequency speaker.

On the other hand, a speaker 6 shown in FIG. 3*b* may be installed on the right side of the dashboard 11 with its duct 61 facing left, another speaker 6 (not shown, but is symmetrical with that shown in FIG. 3*b*) may be installed on the left end of the dashboard 11 with its duct 61 facing right, as shown in FIG. 1.

Figure 2:
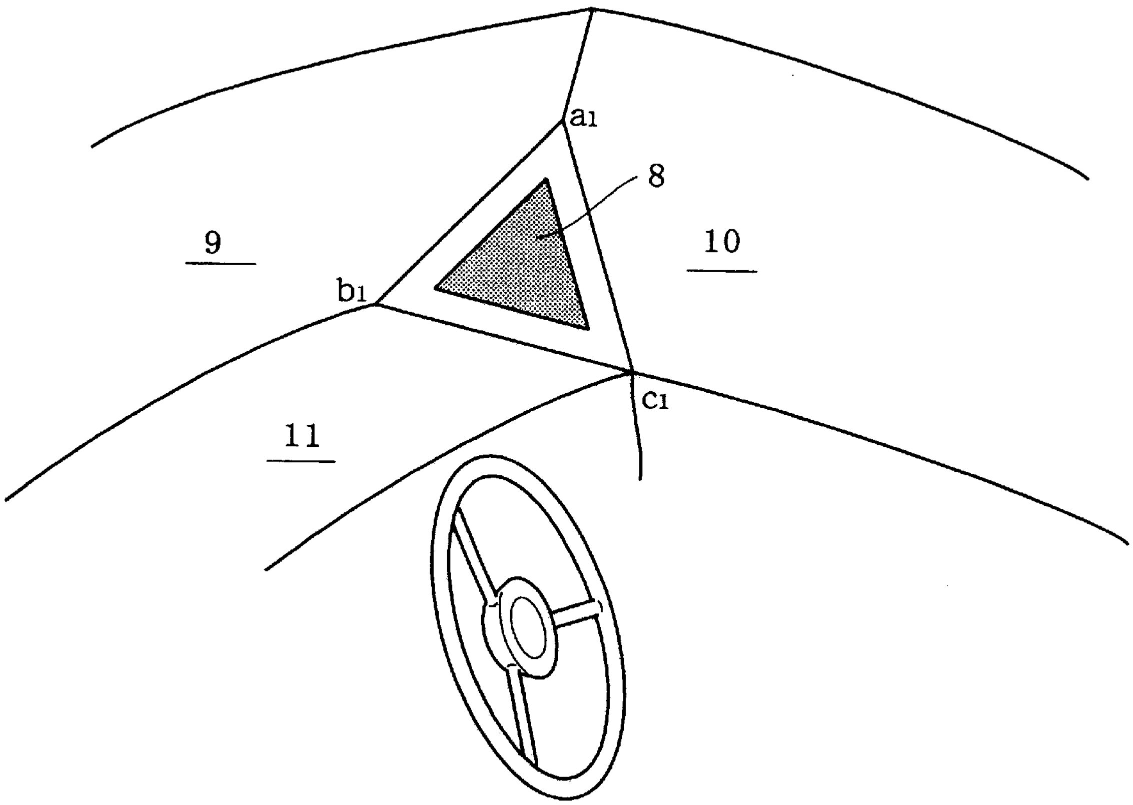
FIG. 2 is an enlarged view showing in detail a part C of FIG. 1.

Referring to FIGS. 1 and 2, the pair of high frequency speakers 8,8 are horn speakers disposed on the opposite ends of a front section within the vehicle. In more detail, the pair of speakers 8,8 are disposed above the dashboard 11 close to the low frequency speakers 6,6. On each end of the dashboard 11, a high frequency speaker 8 is positioned very close to a low frequency speaker 6. In fact, each speaker 8 includes a part of a windshield 9, a part of a side glass 10, a part of an upper surface of the dashboard 11, as shown in FIG. 2.

Referring to FIG. 1, the whole frequency speaker 7 is disposed in the center of the upper surface of the dashboard 11. In this way, the speaker 7 is located in a position between the two speakers 6,6 and also between the two speakers 8,8.

Figure 4A:
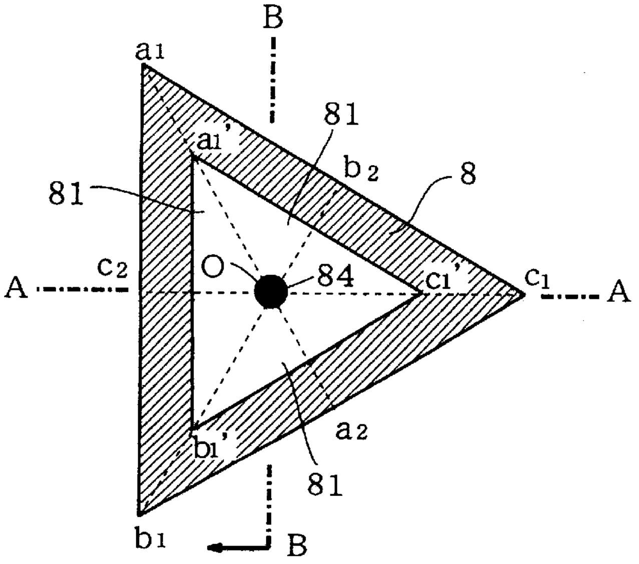
FIG. 4*a* is a front view showing a high frequency speaker of the present invention.
Figure 4B:
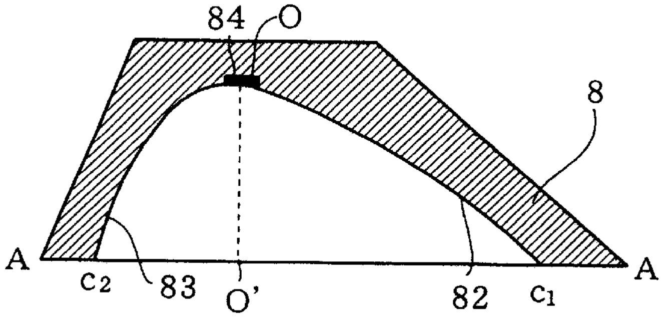
FIG. 4*b* is a cross sectional view taken along line A—A in FIG. 4*a*.
Figure 4C:
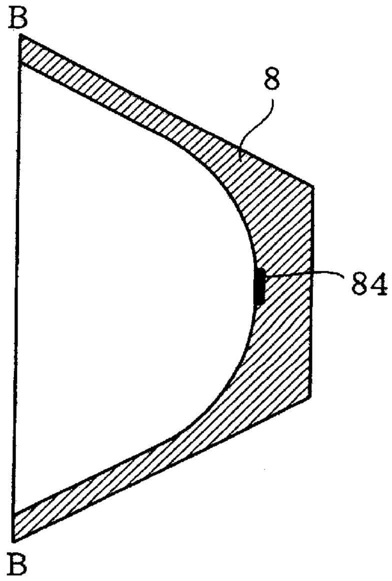
FIG. 4*c* is a cross sectional view taken along line B—B in FIG. 4*a*.

Referring to FIG. 4, each horn speaker 8 is a parabolic type horn speaker comprising three parabolic surfaces surrounding a vibrating diaphragm 84. FIG. 4*a* shows a front shape of the speaker 8. As shown in FIGS. 2 and 4*a*, a part of the windshield 9, a part of the side glasses 10, a part of the upper surface of the dashboard 11, together form a continuous triangular contour. FIG. 4*b* is a cross sectional view taken along line A—A in FIG. 4*a*. FIG. 4*c* is a cross sectional view taken along line B—B in FIG. 4*a*.

In more detail, as shown in FIGS. 4*a* and 4*b*, apexes $a_1$, $b_1$, $c_1$ and a center 0 of the triangular form lines $\underline{a_1\mathbf{0}},\underline{b_1\mathbf{0}},\underline{c_1\mathbf{0}}$ which serve as a parabolic line 82 in FIG. 4*b*. The intersections $\underline{a_2},\underline{b_2},\underline{c_2}$ are formed by extended lines of lines $\underline{a_1\mathbf{0}},\underline{b_1\mathbf{0}},\underline{c_1\mathbf{0}}$ with lines $\underline{a_1b_1},\underline{a_1c_1},\underline{b_1c_1}$. These intersections $\underline{a_2},\underline{b_2},\underline{c_2}$ and the center 0 form lines $\underline{a_2\mathbf{0}},\underline{b_2\mathbf{0}},\underline{c_2\mathbf{0}}$ which serve as parabolic lines 83 in FIG. 4*b*. As shown in FIG. 2*b*, if equal interval points (corresponding to intervals on line 00') on parabolic lines 82 and 83 are connected in a spline-like pattern, three paraboloidal surfaces 81 will be formed. In fact, the paraboloidal surfaces 81 are formed by a part of the windshield 9, a part of a side glass 10, a part of an upper surface of the dashboard 11, in a mutually continued manner.

In the speaker system of the present invention, the pair of high frequency speakers 8,8 are disposed on the left and right ends in the front section within an automobile vehicle. In fact, each speaker 8 is formed by a part of the windshield 9, a part of the side glass 10, a part of the upper surface of the dashboard 11 (all of which server as reflecting surfaces in a prior art). In a prior art, the sounds directly emitted from speakers and the sounds reflected from various surfaces in a vehicle will arrive at ears of a listener at different times. In contrast to this, in the present invention, since the windshield 9, the side glasses 10,10, the upper surface of the dashboard 11 are partially used to form the high frequency speakers 8,8, only sound signals directed emitted from speakers can reach the listener, ensuring that a sound image is located in the front within the vehicle.

Further, since the whole frequency speaker 7 is disposed in the center of the front section in the vehicle 1, the sound image may be more exactly located in the front (on the surface of the windshield 9), enabling every person sitting in different positions within the vehicle to fully enjoy music.

Moreover, since the low frequency speakers 6,6 are bass-reflex type speakers, they are compact in size and have high output power. At this time, since the ducts 61 of the speakers 6,6 are arranged to face the center console 12, the air driven through the ducts 61,61 can be prevented from getting to the faces of the persons sitting in the vehicle, thus enabling them to avoid direct uncomfortable feeling.

In addition, in the speaker system of the present invention, since the low/middle frequency speakers 6,6 are located very close to the high frequency speakers 8,8, the low/middle frequency sound and the high frequency sound are seen to be emitted from only one position, thereby alleviating sound turbulence near crossovers, making clear the position of a sound image, enabling a listener to obtain a natural and comfortable music feeling.

Besides, since the low/middle frequency speakers 6,6 are disposed at positions higher than those in a prior art (in a prior art low/middle frequency speakers are usually attached at the lower portions of front doors), it becomes possible to reduce dip phenomenon usually caused in a low/middle frequency band, obtaining an improved low/middle frequency sound.

Finally, in the speaker system of the present invention, since the high frequency speakers 8,8 are parabolic type horn speakers each having a three parabolic surfaces, a further improvement may be expected in locating a sound image in the front.

Figure 5:
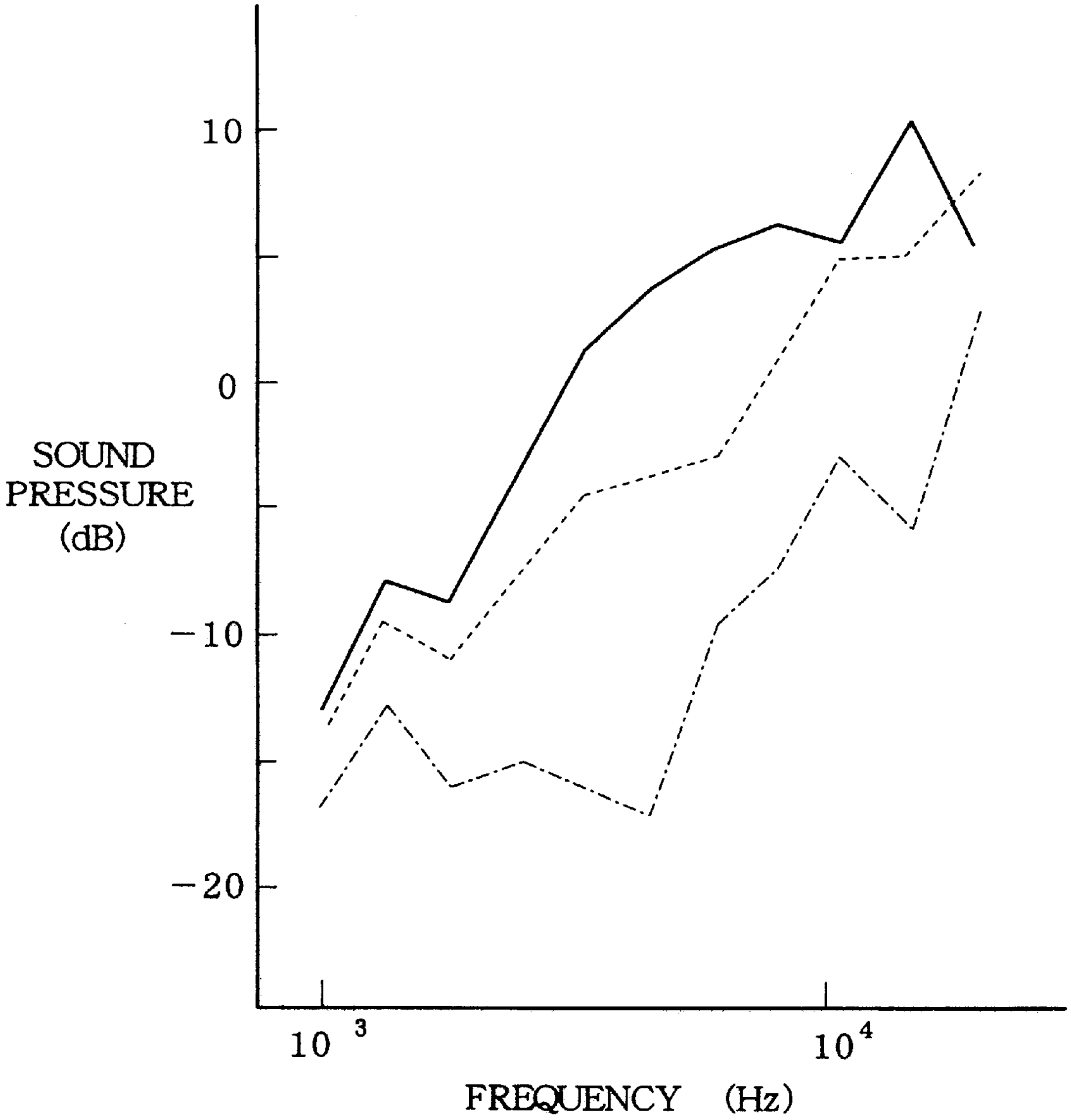
FIG. 5 is a graph showing a directional characteristic of the high frequency speaker illustrated in FIGS. 4*a*–4*c*.
Figure 6:
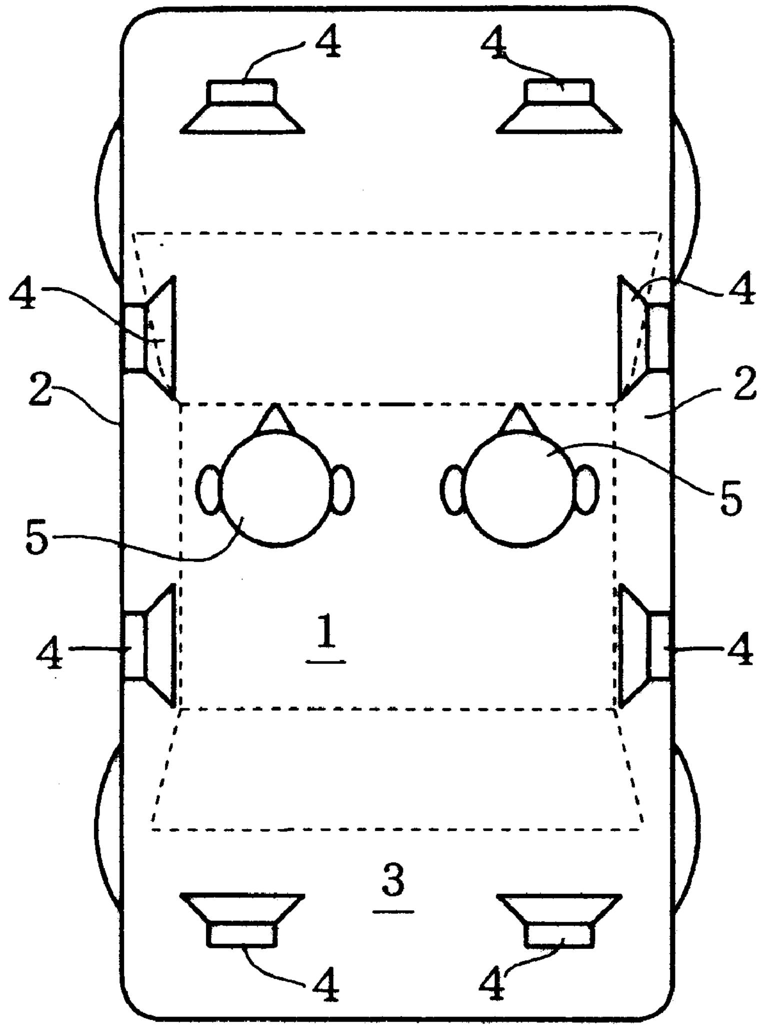
FIG.6 PRIOR ART
FIG. 6 is a plane view showing an automobile speaker system according to prior art.

FIG. 5 is a graph indicating a directional characteristic of each parabolic type horn speaker 8. In FIG. 5, a solid line indicates a directional characteristic of a speaker 8 with respect to a front position directly facing the center of the speaker 8, a broken line indicates a directional characteristic of a speaker 8 with respect to a position turned 30 degree from the above front position, a dotted line indicates a directional characteristic of a speaker 8 with respect to a position turned 60 degree from the above front position. In any of the above three cases, each position is 1 meter away from the horn speaker 8, whilst the measurements are performed at the same height.

As can be understood in FIG. 5, although sound pressures will be different in different positions, there are only little change in the directional characteristics. This means, the directional characteristic of a speaker 8, which has an effect on sound quality, does not change very much irrespective of different positions (to which it is directed). Thus, the solid line, the broken line and dotted line have substantially the same shape in FIG. 5, indicating there is only very little deterioration in sound quality.

Referring again to FIG. 5, a parabolic type horn speaker has a property which indicates that the farther away a position is turned from a front position, the lower a sound pressure level will be. In the present invention, although a sound pressure becomes lower when a position becomes farther away from a front position, the directional characteristics in different positions may be maintained substantially unchanged. This property is sufficiently used in the present invention, so that it has become possible to obtain an effect of an uniform sound spreading.

In more detail, as shown in FIG. 1, a high frequency speaker 8 on the left is positioned to have its opening directed rightwardly, another high frequency speaker 8 on the right is positioned to have its opening directed leftwardly, rendering two normal lines of the two speakers 8,8 intersected with each other in nearby space.

With the use of the above arrangement, a listener on the left will naturally be located in a front position directly facing the speaker 8 on the right, and will be at the same time located in a position which may be seen to have been somehow turned away from a front position directly facing the speaker 8 on the left. In such a condition, as far as a listener on the left is concerned, a sound pressure from the speaker 8 on the left will be relatively lower than a sound pressure from the speaker 8 on the right.

Similarly, a listener on the right will be naturally located in a front position directly facing the speaker 8 on the left, and will be at the same time located in a position which may be seen to have been somehow turned away from a front position directly facing the speaker 8 on the right. In such a condition, as far as a listener on the right is concerned, a sound pressure from the speaker 8 on the right will be relatively lower than a sound pressure from the speaker 8 on the left.

In this way, as far as a listener on the left or the right is concerned, since a high frequency speaker 8 located relatively close to him gives a comparatively low sound pressure and a high frequency speaker 8 located relatively far away from him gives a comparatively high sound pressure, it seems to him as if the two sound pressures are substantially equal to each other, thereby enabling him to obtain a balanced feeling of sound pressure and thus a feeling of uniform sound spreading within the internal space of the vehicle.

With the use of the speaker system according to the present invention, it becomes possible not only to exactly locate a sound image in the front within an automobile vehicle, but also to obtain an excellent directional characteristic of speakers, enabling a listener to obtain a natural feeling to fully enjoy music or the like when he is staying in the vehicle.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A speaker system for use in an automobile vehicle having a windshield, a side glass located on each side of the vehicle and an upper surface of a dashboard, said speaker system comprising:

a pair of high frequency speakers disposed at opposite ends in a lateral direction of a front section within the vehicle;

wherein each of the high frequency speakers is a horn speaker made from a part of the windshield, a part of the side glass and a part of the upper surface of the dashboard in the vehicle.

2. The speaker system according to claim 1, further including a pair of low/middle frequency speakers disposed at opposite ends in a lateral direction of the front section within the vehicle.

3. The speaker system according to claim 2, wherein each of the low/middle frequency speakers is positioned such that its diaphragm is directed to a front seat.

4. The speaker system according to claim 2, wherein each of the low/middle frequency speakers is a bass-reflex type speaker having a duct.

5. The speaker system according to claim 4, wherein the pair of bass-reflex type speakers are installed on a dashboard, in a manner such that both ducts are directed to a center console within the vehicle.

6. The speaker system according to claim 1, wherein on each side of the front section in the vehicle, a high frequency speaker and a low/middle frequency speaker are located in positions close to each other.

7. The speaker system according to claim 1, wherein a high frequency speaker on the left is positioned to have its opening directed rightwardly, another high frequency speaker on the right is positioned to have its opening directed leftwardly, rendering two normal lines of the two speakers intersected with each other in a nearby space.

8. The speaker system according to claim 1, further comprising a whole frequency speaker located in the center of the front section within the vehicle.

9. A speaker system for use in a vehicle having a windshield, a side glass located on each side of the vehicle and an upper surface of a dashboard, said speaker system comprising:

a pair of high frequency speakers disposed at opposite ends in a lateral direction of a front section with in the vehicle;

wherein each of the high frequency speakers is a horn speaker having a first edge formed from a part of the windshield, a second edge formed from a part of the side glass and a third edge formed from part of the upper surface of the dashboard in the vehicle such that only sounds directly emitted from the high frequency speakers reach a listener.

10. A speaker system for use in a vehicle having a windshield, a side glass located on each side of the vehicle and an upper surface of a dashboard, said speaker system comprising:

a pair of high frequency speakers disposed at opposite ends in a lateral direction of a front section within the vehicle;

wherein each of the high frequency speakers is constructed to have sound producing surfaces which extend in a mutually continuous manner into a part of the windshield, a part of the side glass and a part of the upper surface of the dashboard in the vehicle.

11. A speaker system for use in a vehicle having a windshield, a side glass located on each side of the vehicle and an upper surface of a dashboard, said speaker system comprising:

a pair of high frequency speakers disposed at opposite ends in a lateral direction of a front section within the vehicle;

wherein each of the high frequency speakers is constructed to have sound producing surfaces which extend in a mutually continuous manner into a part of the windshield, a part of the side glass and a part of the upper surface of the dashboard in the vehicle such that only sounds directly emitted from the high frequency speakers reach a listener.

* * * * *